US008023725B2

(12) United States Patent
Schwartzberg et al.

(10) Patent No.: US 8,023,725 B2
(45) Date of Patent: Sep. 20, 2011

(54) IDENTIFICATION OF A GRAPHICAL SYMBOL BY IDENTIFYING ITS CONSTITUENT CONTIGUOUS PIXEL GROUPS AS CHARACTERS

(75) Inventors: Yoav Schwartzberg, Jerusalem (IL); Tom Shenhav, Tel-Aviv (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1195 days.

(21) Appl. No.: 11/783,854

(22) Filed: Apr. 12, 2007

(65) Prior Publication Data

US 2008/0253656 A1    Oct. 16, 2008

(51) Int. Cl.
*G06K 9/00* (2006.01)
*G09G 5/00* (2006.01)

(52) U.S. Cl. ........ 382/154; 382/181; 382/284; 382/292; 345/633

(58) Field of Classification Search .................. None
See application file for complete search history.

(56) References Cited

U.S. PATENT DOCUMENTS

| 5,253,305 | A  | * | 10/1993 | Lin ............................... 382/174 |
| 5,892,843 | A  | * | 4/1999  | Zhou et al. .................... 382/176 |
| 6,327,388 | B1 | * | 12/2001 | Zhou et al. .................... 382/204 |
| 6,470,094 | B1 | * | 10/2002 | Lienhart et al. ............... 382/176 |
| 6,826,305 | B2 |   | 11/2004 | Zhu |
| 6,922,484 | B2 | * | 7/2005  | Asano et al. .................. 382/154 |
| 7,177,444 | B2 |   | 2/2007  | Bonner et al. |
| 7,690,975 | B2 | * | 4/2010  | Watanabe et al. .................. 463/1 |
| 2002/0051575 | A1 | * | 5/2002  | Myers et al. .................. 382/202 |
| 2005/0123203 | A1 | * | 6/2005  | Heilper et al. .................. 382/229 |
| 2005/0180632 | A1 | * | 8/2005  | Aradhye et al. ............... 382/182 |

FOREIGN PATENT DOCUMENTS

| GB | 1000542 | 8/1965 |
| GB | 1425024 | 2/1976 |

OTHER PUBLICATIONS

Tsai et al. (Apr. 2002) "Binarization of color document images via luminance and saturation color features." IEEE Trans. on Image Processing, vol. 11 No. 4, pp. 434-451.*
Hartley et al. (2003) "Multiple view geometry in computer vision." 2nd Ed. Cambridge University Press.*
Lepetit et al. (2003) "Fully automated and stable registration for augmented reality applications." Proc. 2nd IEEE/ACM Int'l Symp. on Mixed and Augmented Reality, pp. 93-102.*
Lucas et al. "An Iterative Image Registration Technique With an Application to Stereo Vision", Proceedings of the DARPA Image Understanding Workshop, p. 674-679, 1981.

(Continued)

*Primary Examiner* — Bhavesh Mehta
*Assistant Examiner* — Barry Drennan

(57) ABSTRACT

A method for identifying a predefined graphic symbol having a plurality of graphical characters. The method comprises the following steps: a) receiving a digital image having a plurality of pixels depicting a scene, b) identifying a plurality of first groups of contiguous pixels in the proximity of one another, members of each one the first group having a first common pixel defining property, and c) identifying at least one of the plurality of first groups as one of the plurality of graphical characters, thereby detecting the predefined graphic symbol in the digital image.

19 Claims, 11 Drawing Sheets

OTHER PUBLICATIONS

Mori et al. "Historical Review of OCR Research and Development", Proceedings of the IEEE, 80(7): 1029-1058, 1992. Abstract.

Reif "A Unified Approach to Subdivision Algorithms Near Extraordinary Vertices", Computer Aided Geometric Design, 12: 153-174, 1995.

Sederberg et al. "T-Splines and T-NURCCs", ACM Transactions on Graphics (TOG), 8 P., 2003.

Settgast et al. "Adaptive Tesselation of Subdivision Surfaces", Preprint Submitted to Science, 6 P., 2003.

Shiue et al. "A Realtime GPU Subdivision Kernel", Proceedings of ACM SIGGRAPH 2005, p. 1010-1015, 2005.

Stam "Exact Evaluation of Catmull-Clark Subdivision Surfaces at Arbitrary Parameter Values", Proceedings of the 25th Annual Conference on Computer Graphics and Interactive Techniques, p. 395-404, 1998.

Wu et al. "An Accurate Error Measure for Adaptive Subdivision Surfaces", International Conference on Shape Modeling and Applications (SMI' 05), p. 51-56, 2005.

* cited by examiner

IDENTIFICATION OF A GRAPHICAL SYMBOL BY IDENTIFYING ITS CONSTITUENT CONTIGUOUS PIXEL GROUPS AS CHARACTERS

FIELD AND BACKGROUND OF THE INVENTION

The present invention relates to a system and a method for identifying graphic symbols and, more particularly, but not exclusively, to a system and a method for identifying graphic symbols in digital images.

During the last decade, the field of object detection and recognition has been constantly evolving. Object detection and recognition have become popular areas of research in the field of computer vision and a basis for applications such as graphic symbol and text recognition.

In a number of different technical fields, a need has arisen for systems that are capable of automatically identifying strings of graphical characters. Early examples of character recognition systems include GB1425024 in which an output from a television camera is fed to a comparator for identifying codes applied to boxes. Bar codes are also well known and an early example of such a system is to be found in GB1000542. A review article outlining character recognition system development is to be found as Mori et al: Proceedings of the IEEE, Vol. 80 No. 7 July 1992 pp 1029-1058. Though such a system provides a tool for character recognition, it may only recognize standard barcodes. Moreover, most of the existing methods for graphical characters recognition are designed to read texts or labels from predefined areas of interest or from documents. In such methods and systems, pages of text or images of labels are converted to digital information using a scanner and optical character recognition (OCR) algorithms are then applied to produce a text file.

For example, U.S. Pat. No. 7,177,444, issued on Feb. 13, 2007, describes a method and an apparatus for reading and decoding information extracted from a form wherein packages are randomly placed on a conveyor belt, with their labels facing a two-camera subassembly. As the conveyor belt moves, the two-camera subassembly continuously takes images of the belt underneath the overhead camera. The design of the camera permits it to take a high-resolution image of a non-singulated, unjustified package flow. A digital image of the packages within the field of view of the camera is then transferred to the processing system for analysis. The processing system identifies individual packages in the image, extracts them and then analyzes the information written on the package labels. The analysis process utilizes conventional OCR and intelligent character recognition (ICR) techniques to evaluate the information written on the package label. Once the information is decoded, the system either accesses a database record associated with the decoded machine-readable code, or creates a new record. When an unknown word image is encountered, the field-specific recognition process is aided by use of lexicon information, optimized based on installation-specific or user-specific criteria.

Though such a method is effective for reading and decoding information extracted from a form or a digital image of a form, it cannot be used for reading and decoding graphical characters of labels in a digital image that depicts a scene. In order to identify graphical characters of labels, which are depicted in a digital image of a scene, a number of factors have to be considered. For example, each one of the components in the digital image has to be analyzed to determine whether it is a text component or not. Moreover, each text component has to be compared against characteristics, such as size, as the distance between the image sensors that take the digital image and the components being imaged is not constant. Moreover, as the angle and the distance between the image sensor that takes the digital image and the components are not constant, additional factors have to be considered during the text component identification process.

An example of a system that overcomes some of these factors is a system for identifying and recording car number plates as part of a vehicle monitoring and control system. Another example of such a system is disclosed in U.S. Pat. No. 6,826,305, issued on Nov. 30, 2004 that describes techniques for identifying labels appearing in images. A digital image is analyzed to identify individual components. Each of the individual components is analyzed to determine whether it is a text component or not by comparing it against characteristics such as size, aspect ratio, and proximity to other components. Each component identified as a text component is compared against characteristics such as size in order to identify it as a label or not. Location coordinates of each label are stored in association with the label and optical character recognition is performed on the labels. Once the labels are identified, each image may be used as an online catalog page. For example, an image may be used to construct a web page containing pictures of available products with each label serving as a hypertext link to retrieve further information about the product or to enter an order for the product. Automatically identifying labels simplifies the conversion of preexisting paper catalog pages to online catalog pages or similar digitized images. Such a system may be used for analyzing images using a stationary computer and an image sensor.

However, such a method, as many other methods, which are known in the label detection field, is computationally expensive and demands a substantial amount of memory allocation. In particular, since the size of the graphical character relative to the size of the digital image is not always known, the graphical character detection process has to include repetitive search steps. The high number of iterations makes such a search computationally expensive. Moreover, the search has to include steps of matching the potential graphical character with different translational, rotational, and scaling parameters. The matching requires the allocation of even more memory. In addition, such a technique requires a database of graphical characters for the searching. Maintaining such a database on a mobile telephone, for example, requires a substantial amount of memory allocation.

One of the challenges in the field is to implement graphical character detection methods in a computing unit with limited memory resources, and with limited computational abilities.

In parallel to the field of object detection and recognition that has been constantly evolving during the last decade, the field of augmented reality technology that allows a person to see or otherwise sense a computer-generated virtual world integrated with the real world has also been constantly evolving. The "real world" is the environment that an observer can see, feel, hear, taste, or smell using the observer's own senses. The "virtual world" is defined as a generated environment stored in a storage medium or calculated using a processor. A tracker system within the augmented reality technology registers the virtual world to the real world to integrate virtual and real information in a manner usable by the observer.

Augmented reality technology essentially "connects" a human user to a database or to a partially virtual or virtual environment using any combination of the human user's visual, aural, or kinesthetic senses.

Although augmented reality technology is rapidly evolving, new solutions can still be explored, especially in the cellular arena.

There is thus a widely recognized need for, and it would be highly advantageous to have, an apparatus and a method for graphic symbol detection for a computing unit with limited memory and computational power and a method that provide new augmented reality solutions, which are devoid of the above limitations.

SUMMARY OF THE INVENTION

According to one aspect of the present invention there is provided a method for identifying a predefined graphic symbol having a plurality of graphical characters. The method comprises a) receiving a digital image having a plurality of pixels depicting a scene, b) identifying a plurality of first groups of contiguous pixels in the proximity of one another, members of each one the first group having a first common pixel defining property, and c) identifying at least one of the plurality of first groups as one of the plurality of graphical characters, thereby detecting the predefined graphic symbol in the digital image.

Preferably, the method further comprises a step a1) between step a) and b) of identifying a second group of contiguous pixels, the second group having a second common pixel defining property, wherein the plurality of first groups is in the proximity of the second group.

Preferably, the method further comprises a step b1) between step b) and c) of identifying an order of the plurality of second groups in relation to the position of each one of them in the digital image, the identifying of step c) being performed according to the place of the at least one of the plurality of first groups in the order.

Preferably, the identifying of step b) comprises a step of substantially enclosing each the first group in a respective first bounding-box, the first bounding-boxes is used during step c).

More preferably, the step a1) identifying of step b) comprises a step of substantially enclosing the plurality of first groups in a second bounding-box, the second bounding-box is used during step c).

More preferably, the method further comprises a step between step b) and b1) of identifying a line that approximately intersects the geometric center of each the first group, the order being determined according to relative position each the each the first group along the line.

More preferably, the line is a regression line.

More preferably, the method further comprises a step between step b) and b1) of detecting and removing outlier groups from the plurality of first groups.

Preferably, the method further comprises the following steps: d) identifying a homography matrix according to at least one of the identified plurality of first groups, and e) using the homography matrix for augmenting a virtual object with the digital image.

More preferably, the homography matrix is calculated according to at least four reference points of the identified plurality of first groups.

More preferably, each three of the at least four references are non-collinear.

More preferably, the method further comprises a step between step a) and b) of generating a binary map image based on the second bounding-box, the identifying of step b) being performed according to the binary map.

More preferably, the generating comprises a step of applying a color property threshold on the color property of the plurality of pixels.

More preferably, the color property threshold is a member of the following group: a constant threshold, a dynamic threshold, and a Niblack threshold.

Preferably, the identifying of step b) comprises a step of finding connected components, each the connected component is tagged as one of the plurality of first groups.

Preferably, the identifying of step b) comprising a step of removing members of the plurality of first groups that does not comply with a set of predefined geometric characteristics.

More preferably, the set of predefined geometric characteristics comprises a member of the following group: a predefined aspect ratio between the width and the height, having an area in a predefined range, having an area in a predefined range in relation to an area that encloses the first group, having an area in a predefined range in relation at least a portion of the plurality of second bounding-boxes.

According to another aspect of the present invention there is provided a method for augmenting a virtual object with a digital image. The method comprises a) receiving the digital image, the digital image depicts a graphic symbol, b) identifying the graphic symbol in the digital image, and c) augmenting the digital image with the virtual object, to create an augmented-reality image, for presentation to a user.

Preferably, the virtual object comprises a graphical object, the augmented-reality image having the graphical object positioned in close proximity to the graphic symbol.

Preferably, the virtual object, the digital image, and the augmented-reality image are video images.

Preferably, the method further comprises a step between steps a) and b) of identifying a homography matrix according characteristics of the graphic symbol, the augmenting comprises a step of using the homography matrix.

More preferably, the homography matrix is calculated according to at least four reference points identified in the graphic symbol.

More preferably, the augmented-reality image is based on the digital image.

According to another aspect of the present invention there is provided an apparatus suitable for viewing a digital image depicting a scene. The apparatus comprises an image input device having a connection to an image sensor, the image input device adapted to receive the digital image from the image sensor, a graphic symbol detection module adapted to detecting a label in the scene, an image augmenting module adapted to augment the scene with a virtual object, to create an augmented-reality image, and a display device for displaying the augmented-reality image.

Preferably, the augmented-reality image is based on the digital image.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and device of the present invention involves performing or completing certain selected tasks or steps manually, automatically, or a combination thereof. Moreover, according to actual instrumentation and equipment of preferred embodiments of the method and device of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and device of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
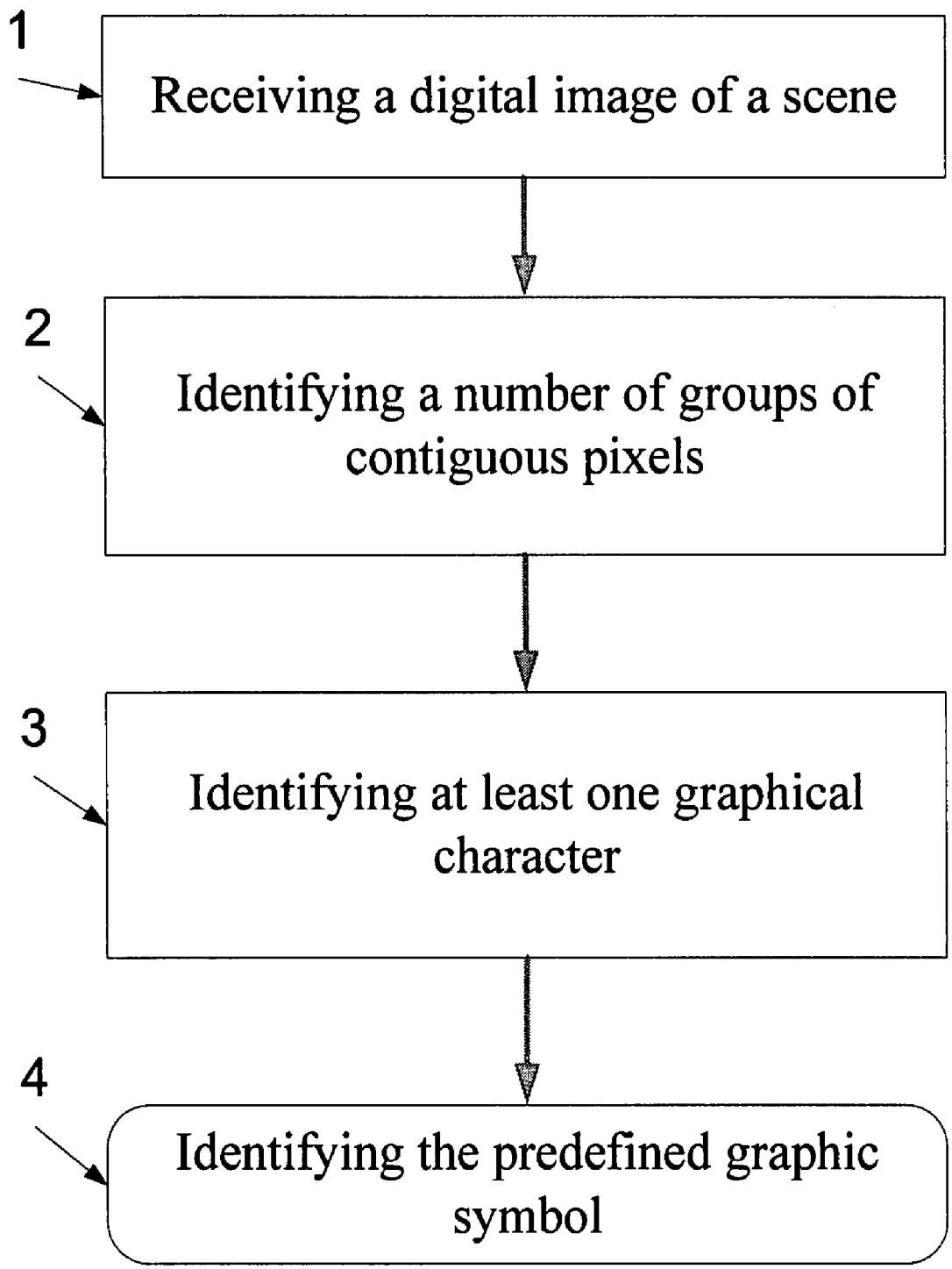
FIG. 1 is a flowchart that illustrates a method for graphic symbol detection, according to one preferred embodiment of the present invention.

The present embodiments comprise an apparatus and a method for identifying a predefined graphic symbol, such as a logo, having a number of graphical characters arranged in a digital image that depicts a scene. The method is based on a number of steps. Initially, the digital image is received and one or more candidate symbol segments that enclose candidate graphic symbols are identified. Then, a number of groups of contiguous pixels, which are arranged in the proximity of one another, are detected in each symbol segment. The members of each one of the groups have a common pixel defining property. Preferably, a number of character bounding-boxes, each designed to enclose one of the graphical characters, are defined, each character bounding-box enclosing a different group. In such a manner, all the potential characters are identified and the boundaries thereof are marked. Then, at least one of the enclosed groups of pixels is identified as one of the graphical characters of the predefined graphic symbol.

According to another aspect of the present invention, there is provided a method and a device for augmenting a virtual object with a digital image that depicts a real scene with a predefined graphic symbol, such as a logo. During a first step, a digital image that comprises a symbol segment is received. Then, the predefined graphic symbol is identified within the symbol segment of the digital image. After the predefined graphic symbol has been identified, the digital image is augmented with a virtual object, such as one or more graphical objects, to create an augmented-reality image having the graphic symbol and the virtual object therein. The augmented-reality image is presented to a user, preferably using a screen. Preferably, the digital image, the virtual object, and the augmented-reality image are frames, which are taken from video sequences, as described below.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

A pixel defining property may be understood as a color property in a color image, a brightness property in a grayscale image, or any value that define a property of a certain pixel that is part of a digital image that depicts a scene.

A graphical character may be understood as a letter, a digit, or other symbol that is used as part of the organization, the control, or the representation of data.

A predefined graphic symbol may be understood as a graphic symbol, a mark, a trademark, a word, a name, a symbol, a device, or a combination of them. The predefined graphic symbol comprises one or more graphical characters.

A virtual object may be understood as a two dimensional (2D) object, a three dimensional (3D) object, a virtual image, a graphical object, a bitmap, a video sequence, and a model of an object.

Reference is now made to FIG. 1, which is a flowchart that illustrates a method for graphic symbol detection, according to one preferred embodiment of the present invention.

The method is based on one or more predefined graphic symbols. Each predefined graphic symbol comprises one or more graphical characters and one or more pixel defining properties. Each graphical character is defined according a set of predefined characteristics, such as the angle and the lengths of strokes that comprise the graphical character.

FIG. 1 depicts a number of steps. During the first step, as shown at 1, a digital image 1 that depicts a scene is received. The scene comprises a predefined graphic symbol with a number of graphical characters. In one embodiment of the present invention, the digital image is acquired from a preview mode of a certain camera, such as a video camera of a cellular phone or a personal digital assistant (PDA). Such a digital image comprises a plurality of color pixels, each pixel comprising color information. Each pixel holds data bits that represent local brightness and color within the digital image, and the particular image may use any one of a number of different types of color coordinates.

The image sensor that is used to capture such images typically outputs a digital image in red-blue-green (RGB) color coordinates, YCbCr color coordinates, wherein Y is the luma component and Cb and Cr are the blue and red chroma components, or other color space coordinates. However, in the preferred embodiment of the present invention other color coordinates schemes may be used.

The image sensor that is used to capture such images may output a digital image in a variety of color coordinates. The method may preferably comprise a step of converting the color space coordinates of the digital image to YCbCr color coordinates.

During the following step, as shown at 2, the graphical characters of the predefined graphic symbol are identified. A number of groups of contiguous pixels, which are positioned in the proximity of one another, are identified. Pixels of each group have a common pixel defining property. Each one of the groups is a graphical character candidate. Then, as shown at 3, at least one of the groups is identified as one of the graphical characters of the predefined graphic symbol. As shown at 4, the identification of one or more graphical characters allows the identification of the predefined graphic symbol in the received digital image.

Figure 2:
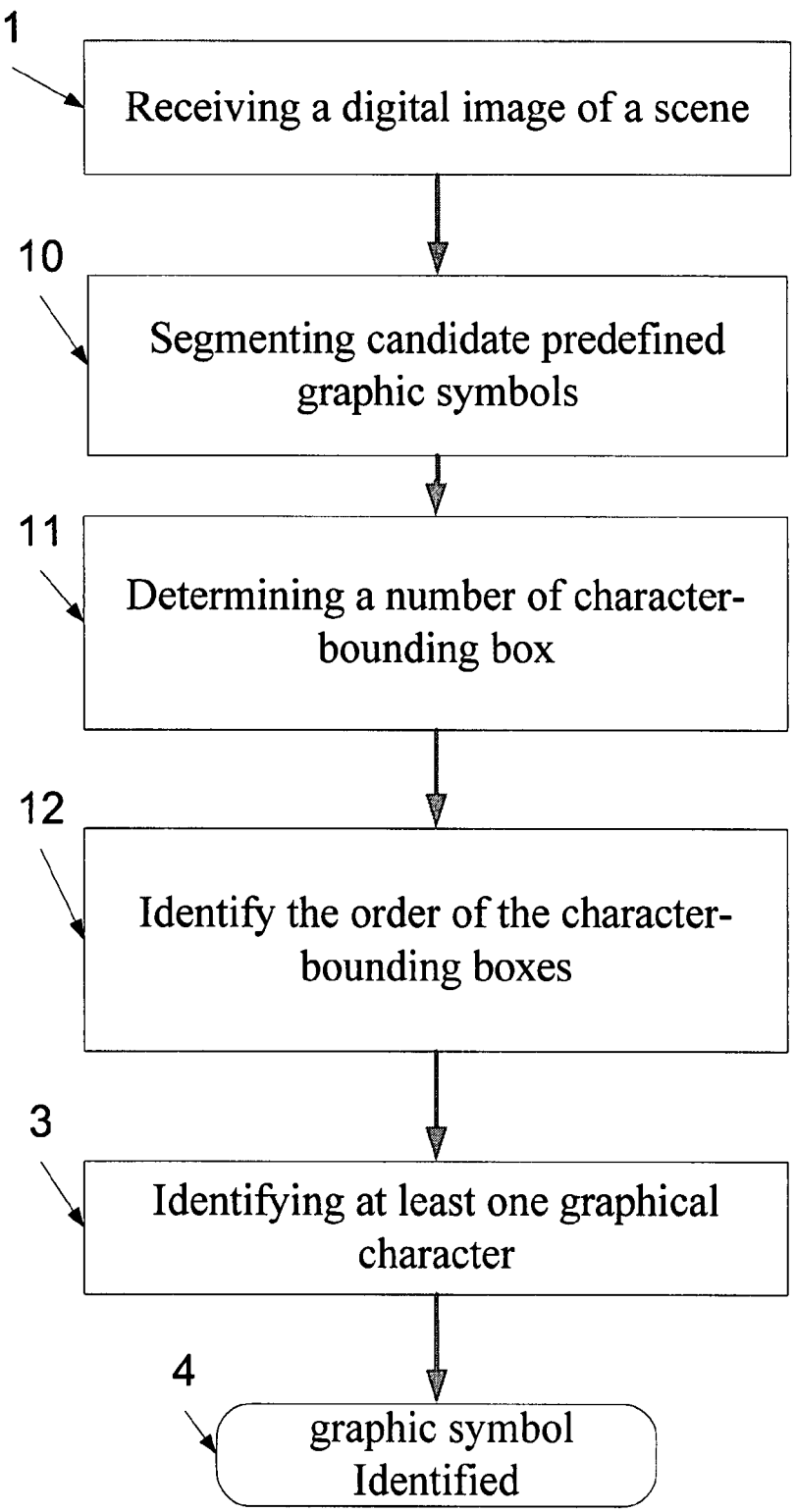
FIG. 2 is another flowchart that illustrates a method for graphic symbol detection, according to one preferred embodiment of the present invention.

Reference is now made to FIG. 2, which is a flowchart that illustrates a method for graphic symbol detection, according to one preferred embodiment of the present invention. Steps 1, 3 and 4 are as in FIG. 1, however steps 10, 11, and 12 are performed as sub-steps of step 2.

After the digital image has been received, as shown at FIG. 2, during step 10, the boundaries of candidate predefined graphic symbols may be identified and segmented, preferably by a symbol bounding-box. Such segmentation reduces the number of pixels, which have to be analyzed in order to identify the requested predefined graphic symbol. Preferably, in order to support the segmentation of the predefined graphic symbol area, a binary map is generated using a threshold. Preferably, each pixel in the segmented area that has a pixel defining property below the threshold is tagged with 0 and each pixel in the segmented area that has a pixel defining property above the threshold is tagged with 1. For example, if the predefined graphic symbol is the Samsung® trademark, or any other graphic symbol that comprises a substantial amount of a certain color, such as blue, the threshold is performed in the YCbCr domain. In such an embodiment, the Y and the Cb values of each pixel are verified. Pixels of the digital image with Y and Cb values in the blue range are tagged as 1 and other pixels are tagged as 0 in the binary map. It should be noted that the range of values is sensor specific. For example, if an Anycall® i730 camera is used, Pixels of the digital image with Y value above 10 and Cr value between 117 and 255 are tagged as 1 and other pixels are tagged as 0 in the binary map.

Figure 3A:
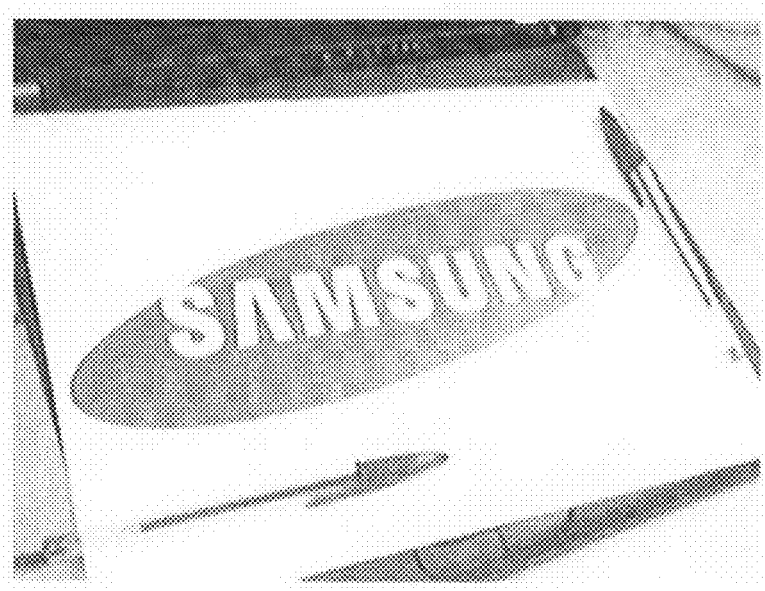
FIGS. 3A, 3B, and 3C respectively depict a digital image that comprises a predefined graphic symbol, a binary map that is based on the digital image of FIG. 3A, and the binary map of with symbol bounding-boxes that enclose bright components therein, all according to one preferred embodiment of the present invention.
Figure 3B:
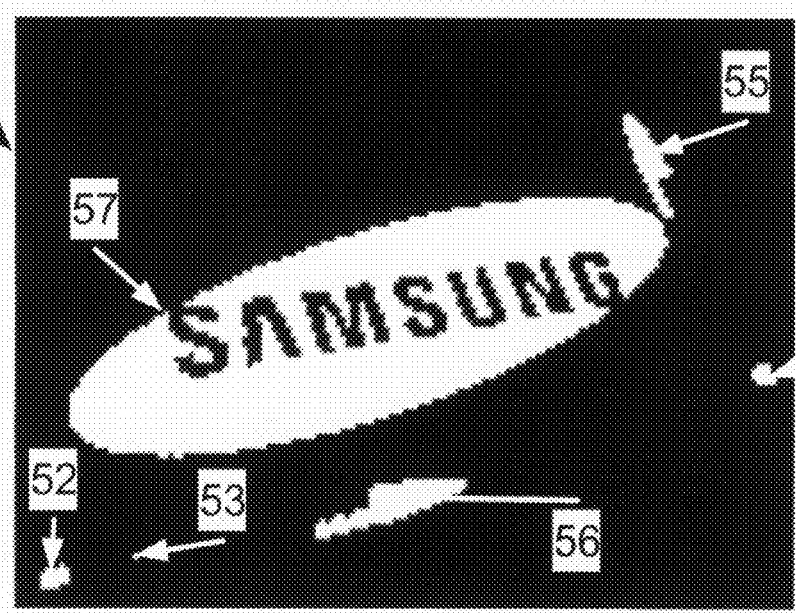

An example for such a binary map is shown at FIG. 3B that depicts a binary map 51 that is based FIG. 3A, which is a digital image that comprises the Samsung® trademark. As depicted in FIGS. 3A and 3B, the blue pixels are converted to 0 and the other pixels are converted to 1.

Preferably, after the binary map has been generated, the binary map is scanned and pixels thereof are grouped into candidate regions according to pixel connectivity. Preferably, a large group of pixels in a candidate region share similar pixel value, such as 0 or 1, and are, in some manner, connected with each other. For example, candidate regions 52-57 in the binary map, which is shown in FIG. 3B, are identified and marked as candidate regions as they comprises a number of contiguous pixels having the same value, preferably 0. Once all the groups have been determined, each pixel is labeled according to the candidate region that it has been assigned thereto.

Preferably, 8-neighbor connected components algorithm is used for identifying one or more candidate regions that may comprise the symbol segment that comprises the predefined graphic symbol.

Preferably, one or more actions are performed to filter out false candidate from the identified candidate regions. Such actions may be based on one or more characteristics of the predefined graphic symbol, such as the size, the shape, and the ratio between the height and the width of the predefined graphic symbol. For example, candidate regions 52-54 in the binary map, which is shown in FIG. 3B, are filtered out from the identified candidate regions as the size of each one of them is smaller than a minimum size of the predefined graphic symbol.

Figure 3C:
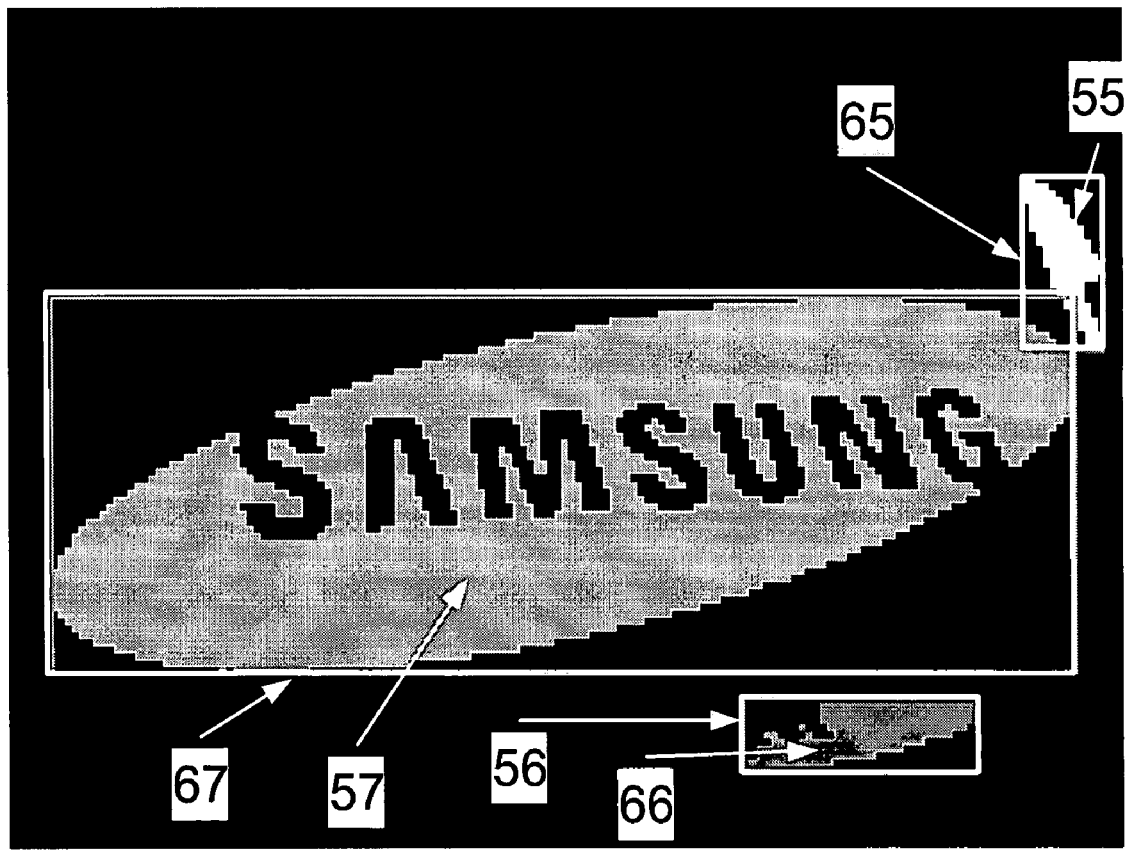

Each one of the remained candidate regions is then enclosed in a symbol bounding-box. The symbol bounding-box is defined as the tightest axes-aligned rectangle that contains all pixels of the respective candidate region. Finding such a symbol bounding-box is a straightforward process. For example, FIG. 3C depicts the symbol bounding-boxes 65, 66, and 67 that respectively enclose candidate regions 55, 56, and 57 in the binary map, which is shown in FIG. 3B.

During the following step, as shown at 11, after a number of symbol bounding-boxes that enclose candidate regions have been identified, a number of character bounding-boxes are segmented in each one of the symbol bounding-box. Each character bounding-box substantially encloses a group of contiguous pixels having a common pixel defining property, such as a common brightness property, as described below.

In one preferred embodiment of the present invention, the graphic characters of the predefined graphic symbol are brighter or darker then the other components thereof. In such an embodiment, before segmenting the character bounding-boxes, a gray level image, which is based upon the pixels in the symbol bounding-box, is generated for each one of the symbol bounding-boxes. Preferably, the gray level image is based on the Y part of the pixels in the area of symbol bounding-boxes in the original image that is preferably represented in an YCbCr color coordinates. Preferably, a second binary map is generated by applying a threshold on the grayscale symbol bounding-box. In such a manner, relatively bright pixels are emphasized over relatively dark pixels and vice versa. Such a binary map allows the separation of the graphic characters from the other components of the predefined graphic symbol, as there are brightness differences between them.

Figure 4A:
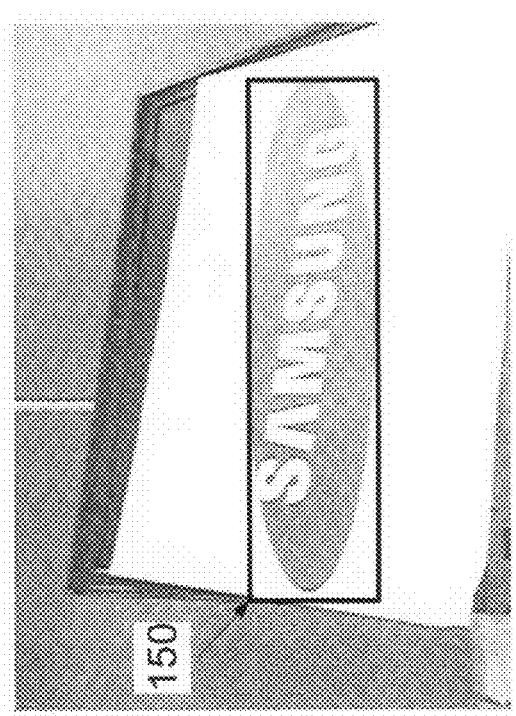
FIGS. 4A-4D respectively depict a digital image that comprises a predefined graphic symbol and three binary maps of a candidate symbol bounding-box, each generated using a different threshold, according to preferred embodiments of the present invention.
Figure 4B:
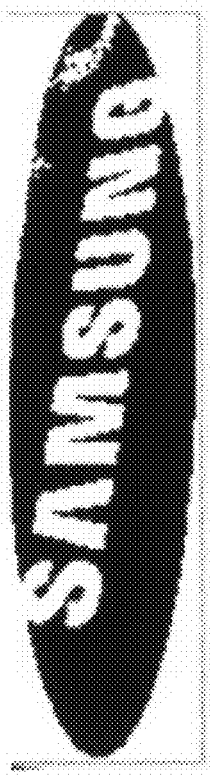
Figure 4C:
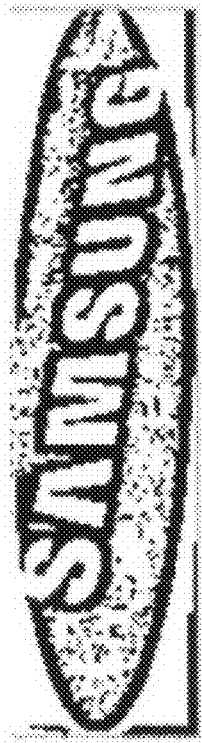
Figure 4D:
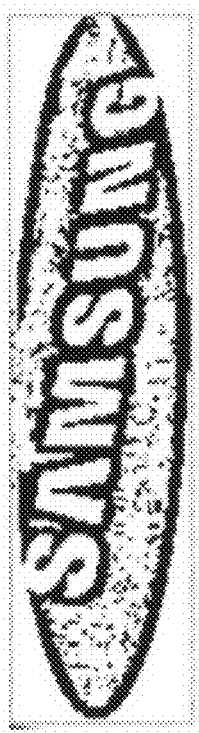

Reference is now made to FIGS. 4A-4B, which are images that comprise the aforementioned exemplary predefined graphic symbol Samsung®. FIG. 4A is an original unprocessed color image, as received by an image sensor, and FIG. 4B-4D are binary maps of a symbol bounding-box 150 that bounds the exemplary predefined graphic symbol Samsung® and identified as described above.

As described above, a second binary map is preferably generated by applying a constant threshold on the grayscale symbol bounding-box. Preferably, the constant threshold is applied to all pixels. In such an embodiment, every pixel that has a gray level above threshold is considered part of a potential graphic character of the graphic symbol. Though such a process has low computational complexity, it is affected by different lighting conditions. Preferably, the user may calibrate the threshold according to the lighting conditions. Preferably, the threshold is adjusted according to the lighting conditions. The lighting conditions may be automatically detected by an image sensor, automatically determined according to the current time, or adjusted by the user. FIG. 4B is an exemplary binary map that has been generated by applying the aforementioned constant threshold.

In another embodiment of the present invention, a dynamic threshold is applied to each pixel in the symbol bounding-box. Preferably, the threshold is a mean of one or more neighboring pixels, which are preferably taken from a predefined window around the pixel. In such a manner, pixels which are brighter than their neighbors and therefore have values above the threshold are represented as white pixels in the binary map and pixels which are darker than their neighbors and therefore have values below the threshold are represented as black pixels. Such a process has relatively low computational complexity and relatively high robustness for varying lighting conditions. FIG. 4C is an exemplary binary map that has been generated by applying the aforementioned dynamic threshold.

In another embodiment of the present invention, a more advanced dynamic threshold is applied. Preferably, a Niblack threshold, which is based on the Niblack algorithm, is applied to each pixel in the symbol bounding-box. The Niblack's algorithm, which is described in W. Niblack, An Introduction to Digital Image Processing, pp. 115-116, Prentice Hall, 1986 that is incorporated herein by reference, is based on the calculation of the local mean and of local standard deviation of a group of neighboring pixels. The threshold is decided by the following formula:

$$T(x,y)=m(x,y)+k\cdot s(x,y),$$

where $m(x, y)$ and $s(x, y)$ are the average of a local area and standard deviation values, respectively. The size of the neighborhood should be small enough to preserve local details, but at the same time large enough to suppress noise. The value of k is used to adjust the weight of the total print object boundary.

Though applying such a threshold has relatively high computational complexity, it produces results that are superior to the applying of the aforementioned constant and dynamic thresholds. FIG. 4D in an exemplary binary map that has been generated by applying the aforementioned Niblack threshold.

Figure 5:
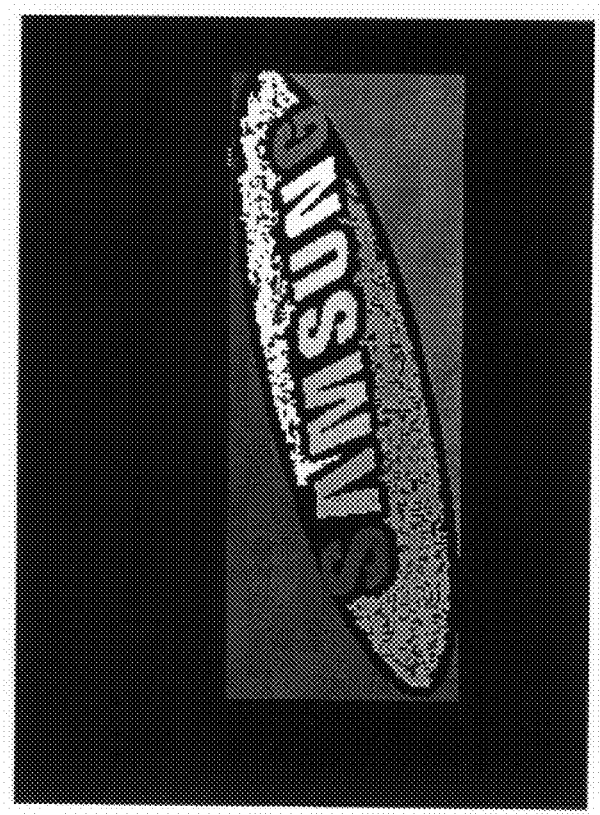
FIG. 5 is a grayscale image of a candidate symbol bounding-box that has been generated using an 8-neighbor connected components algorithm, according to preferred embodiments of the present invention.

Preferably, after the second binary map has been generated, the graphical characters, which are now marked with white pixels, are identified. In order to find white components within the symbol bounding-box, an 8-neighbor connected components algorithm is preferably applied to each one of second binary maps that have been generated for each one of the symbol bounding-boxes. Preferably, a grayscale image that depicts the output of the 8-neighbor connected components algorithm is generated. In the grayscale image, each one of the components within certain the symbol bounding-box is tagged with a different gray hue, and the rest of the pixels of the rest of the image are tagged with as black pixels. Such a grayscale image is depicted in FIG. 5, which is a grayscale image that has been generated using the 8-neighbor connected components algorithm. As depicted in FIG. 5, the pixels of each one of the graphical characters have a different grayscale value.

Preferably, before bounding the connected components in the grayscale image, a number of connected components, which do not comply with one or more predefined geometric characteristics, are filtered out.

Such predefined geometric characteristics may be determined according to the size the shape, the aspect ratio, or the curvature of the graphical characters of the predefined graphic symbol. For example, the number of pixels in each one of the connected components, the aspect ratio between the height and width of the connected component, the size of the connected component in relation to the symbol bounding-box, the size of the connected component in relation to the other connected components, and the number of pixels in the related character bounding-box.

Reference is now made, once again, to FIG. 2. During the following step, as shown at 12, the order of the graphical characters in the character bounding-boxes is identified according to the position of each character bounding-box in relation to symbol bounding-box. In one embodiment of the present invention, it is assumed that the graphical characters in the predefined graphic symbol are aligned along a straight line.

Figure 6:
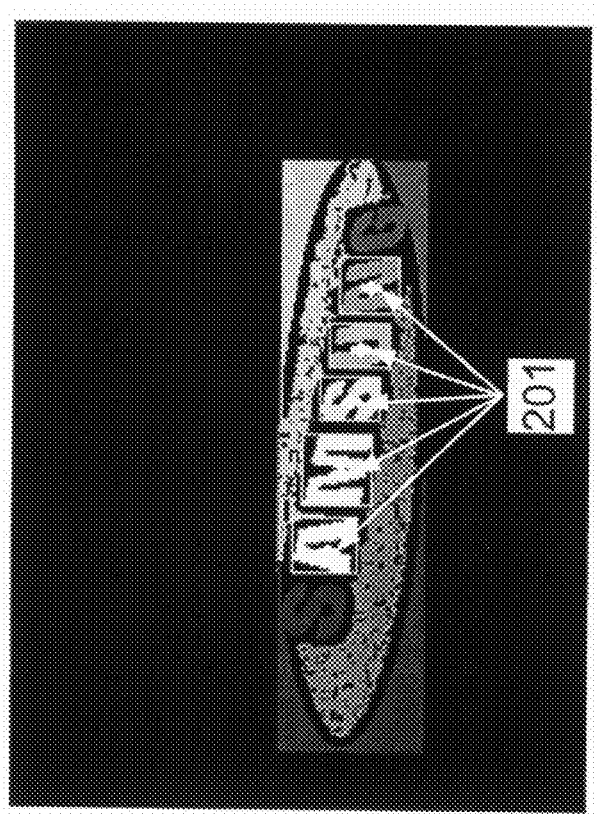
FIG. 6 is the grayscale image of FIG. 5 having a number of character bounding-boxes, according to preferred embodiments of the present invention.

In order to determine efficiently the order, the geometric center of each one of the character bounding-box is identified. The geometric center of each character bounding-box is tagged, with a sub-pixel precision, as the arithmetic mean of the coordinates of all pixels that belong thereto. It should be noted that the geometric center location may not overlap the coordinates of a certain pixel, but may have non-integral coordinates of the image, such as $(x, y)=(35.22, 11.9)$. For example, FIG. 6 depicts a grayscale image that has been generated using the 8-neighbor connected components algorithm, as described above, wherein the graphical characters A, M, S, U, and N have been bounded in character bounding-boxes. The geometric center of each one of the character bounding-boxes has been identified and tagged, as shown at 201 of FIG. 6.

After the geometric centers of the character bounding-boxes have been identified and tagged, a scale line, which is a straight or approximately straight line that intersects all the geometric centers, is identified. Preferably, a regression method, such as linear regression, is applied to all the geometric centers in order to find a direct equation that fulfills or approaches a straight line having the minimum sum of distances from all the geometric centers. The direct equation is the equation of the scale line.

In order to avoid miscalculation of the scale line, the character bounding-boxes that enclose objects which are not the graphical characters of the predefined graphic symbol, which may be referred to as outliers, have to be ignored. Clearly, taking into consideration outliers may lead to finding a scale line that is not aligned with the graphical characters of the predefined graphic symbol. Preferably, a random sample consensus (RANSAC) algorithm is applied to the geometric centers of the character bounding-boxes. The RANSAC algorithm allows the estimation of the scale line with a high degree of accuracy even when outliers are present in the data set. One of the premises of the RANSAC algorithm is that most of the character bounding-boxes enclose graphical characters. The slope of the scale line is used to determine the orientation of the graphical characters in the symbol bounding-box.

As shown at 3 of FIG. 2, after the order of the character bounding-boxes has been identified, preferably using the scale line, at least one of the graphical characters is identified. Based on the identification of one or more graphical characters it is determined whether the symbol bounding-box encloses the predefined graphic symbol or not.

Preferably, each one of the graphical characters is identified according to a set of predefined characteristics that define, as described above, the structure thereof and the arrangement of strokes that it comprises. For example, the set of predefined characteristics define the angle and the lengths of the strokes, the relation between the strokes, the profile of one or more sections thereof, and the width of the strokes.

In one embodiment of the present invention, the predefined graphic symbol is Samsung®. It is assumed that "M" is one of the graphical characters, which are bounded by the character bounding-boxes. The detection of "M" is performed according to the bottom profile or the center profile of the component that is enclosed in the respective bounding-box. "M" is the only letter in the predefined graphic symbol Samsung® having a bottom latitude profile that changes from white to blue and vice versa four times. Moreover, "M" is the only letter in the predefined graphic symbol Samsung® having a center latitude profile that changes from white to blue and vice versa four times or more. Preferably, each one of the character bounding-boxes is graded according to the similarity level of the white component it confines to the bottom profile of "M", the center profile of "M", or both. The character bounding-box that encloses the white component with the highest grade is considered bounding-box that encloses "M".

As described above, the predefined graphic symbol comprises a number of graphical characters, which are ordered in a certain order. The identification of a certain character is expected in a bounding-box that is placed in a location in the order of the bounding-boxes that is respective to the assumed location of the graphical character. For example, if the graphic symbol is Nokia™, it is assumed that the graphical character "k" is enclosed in the third bounding-box and the graphical character "N" is enclosed in the first bounding-box. As each bounding-box encloses a certain character, it expected that the place of a certain graphical character in relation to other graphical characters is respective to the place of the character bounding-box that bounds it in relation to other character bounding-boxes. In such a manner, the identification of one graphical character may be used as a positional anchor for the identification of other graphical characters. Preferably, as described above, the predefined graphic symbol is Samsung®. After "M" has been identified, it is assumed that "N" is enclosed in the character bounding-box that is located three bounding-boxes away from the character bounding-box that encloses "M". The identification of "N" is performed, as described above, according to a set of predefined characteristics that define the structure thereof and the arrangement of strokes that it comprises. Preferably, as shown at 6 of FIG. 2, the identification of any predefined number of graphical characters, such as two, may used for identifying the predefined graphic symbol. Other characters may be identified according to additional sets of characteristics and the location thereof in relation to the positional anchor.

Figure 7:
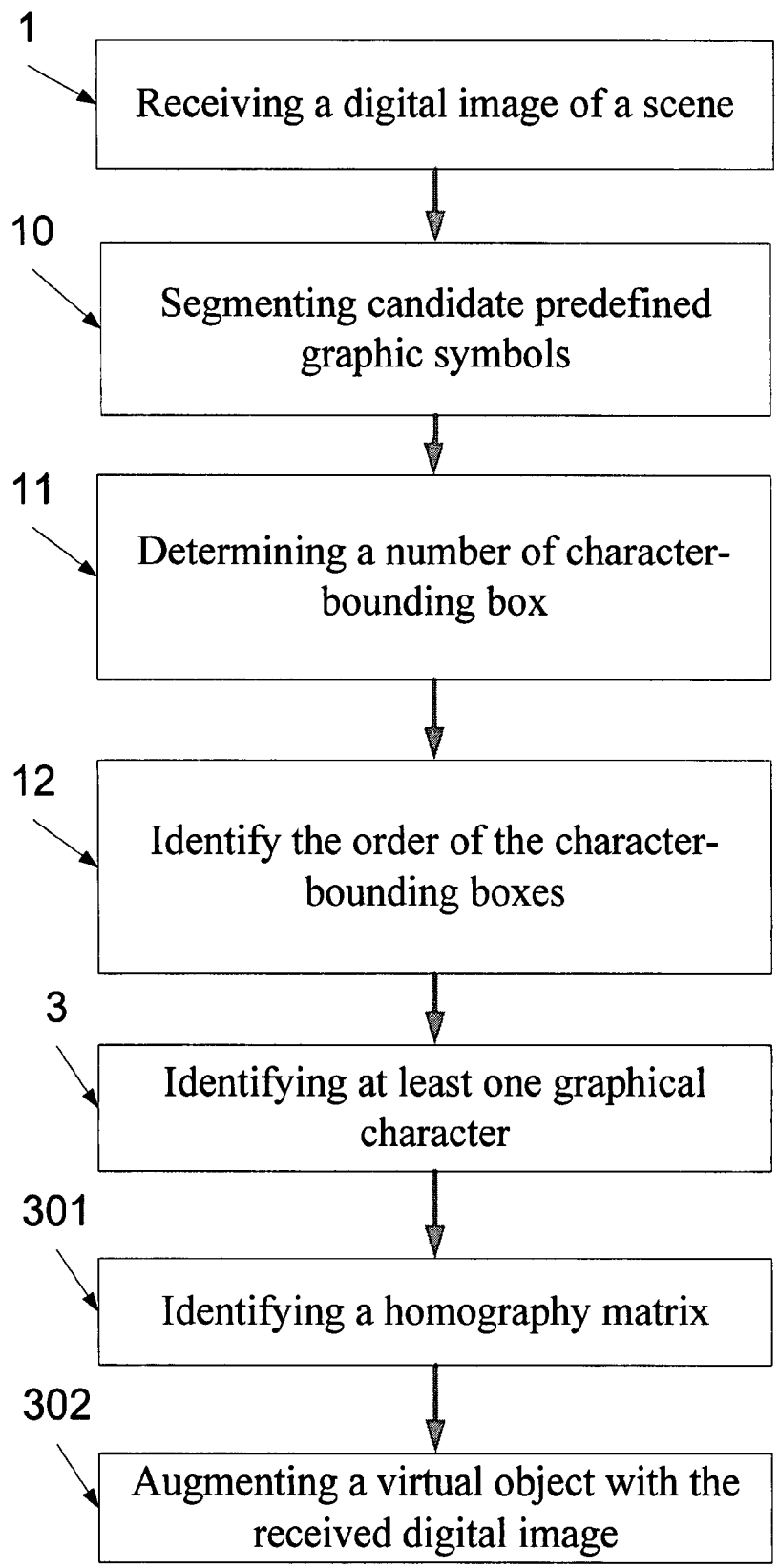
FIG. 7 is a flowchart that illustrates a method for detecting a graphical symbol in a digital image and augmenting the digital image with a virtual object therein, according to one preferred embodiment of the present invention.

Reference is now made to FIG. 7, which is a flowchart that illustrates a method for detecting a graphic symbol in a digital image and augmenting the digital image with a virtual object therein, according to one preferred embodiment of the present invention. Steps 1, 10, 11, 12, and 3 are as in FIG. 2, However, steps 301-302, which are performed in a manner that allows the augmenting of the virtual object as described below, are new.

In one embodiment of the present invention, the identification of one or more graphical characters in the predefined graphic symbol that is depicted in the received digital image 1 triggers the augmenting of a virtual object with the received digital image 1, thereby allows the creating of an augmented-reality image having the predefined graphic symbol therein. Preferably, the image is part of a sequence of images that forms a video image of the real world. The video image is mixed with virtual object that preferably comprises computer-generated graphical elements, preferably via an onboard or external image combiner to form the augmented reality display. Preferably, the virtual object is an object that is rendered according to the position of the imaging device that captures the digital image in relation to the predefined graphic symbol. Such a position may be understood as the current camera pose.

Preferably, the augmented reality image is viewed as connecting one or more virtual environment objects to the real environment as depicted in the video image and observed by a human user. The augmented reality display allows the user to perceive virtual information that is integrated with the real world. Additionally, augmented reality display may enable a user to participate in an activity in a virtual world, such as a game, by translating the user's movements or instructions into the desired response in the virtual world.

After at least one graphical character has been identified, a homography matrix is calculated, as shown at 301, preferably using a number of reference points. The homography matrix is used for augmenting a virtual object plane with the plane of the digital image. The homography matrix maps each point in the virtual object plane to a respective point on the digital image plane. Such a homography has eight degrees of freedom. Thus, four bi-dimensional pixels or sub-pixels in the received digital image are paired with four respective bi-dimensional pixels or sub-pixels in the virtual object. The four points in the received digital image and the respective four points in the virtual object give eight linear equations. The condition for linear independence of the equations is that no three of the four points are collinear. Given more than four pairs of points, the system of equations may be solved using a least-squares method, such as the pseudo-inverse.

The homography matrix is preferably a 3×3 matrix that multiplies each point in the virtual object to find its location on the plane of the received digital image. Preferably, the product is multiplied by a constant that is based on the size of the symbol bounding-box in order to assure that the size of the elements in the virtual object is relatively fixed in relation to the size of the predefined graphic symbol. A point $(x, y)$ on the virtual object plane is represented in homogenous coordinates as $(x, y, 1)$. Such a point is multiplied by the homography matrix to get a result, $(Xt, Yt, Zt)$, where $(Xt/Zt, Yt/Zt)$ is the point in the received digital image. Necessarily, the point lies on the logo plane in the received digital image.

In one embodiment of present invention, the predefined graphic symbol is Samsung® and the graphical characters "M" and "N" are identified, as described above. In such an embodiment, two points are identified on the graphical character "M" and two additional points are identified on the graphical character "N" in a manner that assures that no three of the four points are collinear.

Figure 8:
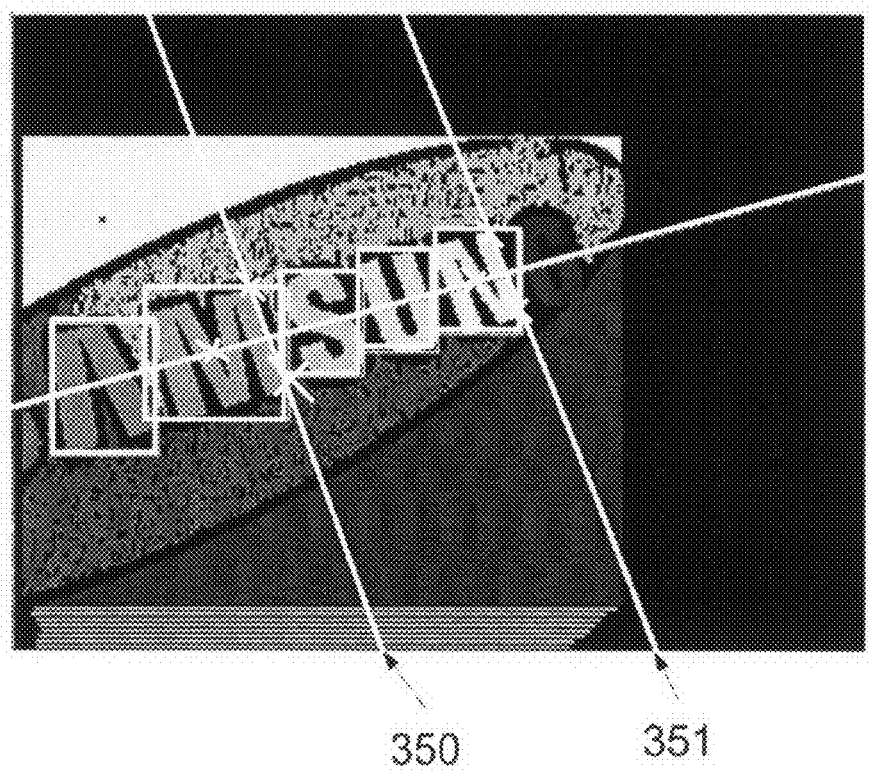
FIG. 8 is the grayscale image of FIG. 5 having longitudinal character bounding lines that bounds characters in the predefined graphic symbol, according to one preferred embodiment of the present invention.

Preferably, the equations of longitudinal character bounding lines are computed separately for M and for N. Such longitudinal character bounding lines are depicted in 350 and 351 in FIG. 8. Preferably, each longitudinal character bounding line is calculated according to the rightmost pixels of the white component element in each one of the related character bounding-box. The rightmost pixels are chosen according to the order of the character bounding-boxes. In such a manner, the pixels that depict the right edges of the bounded characters are chosen regardless to the angle of the graphical symbol in relation to the depicting digital image. All the rightmost pixels are used for calculating a longitudinal character bounding line that bounds the rightmost part of the graphical character, preferably by calculating a linear regression or applying the RANSAC algorithm.

Figure 9:
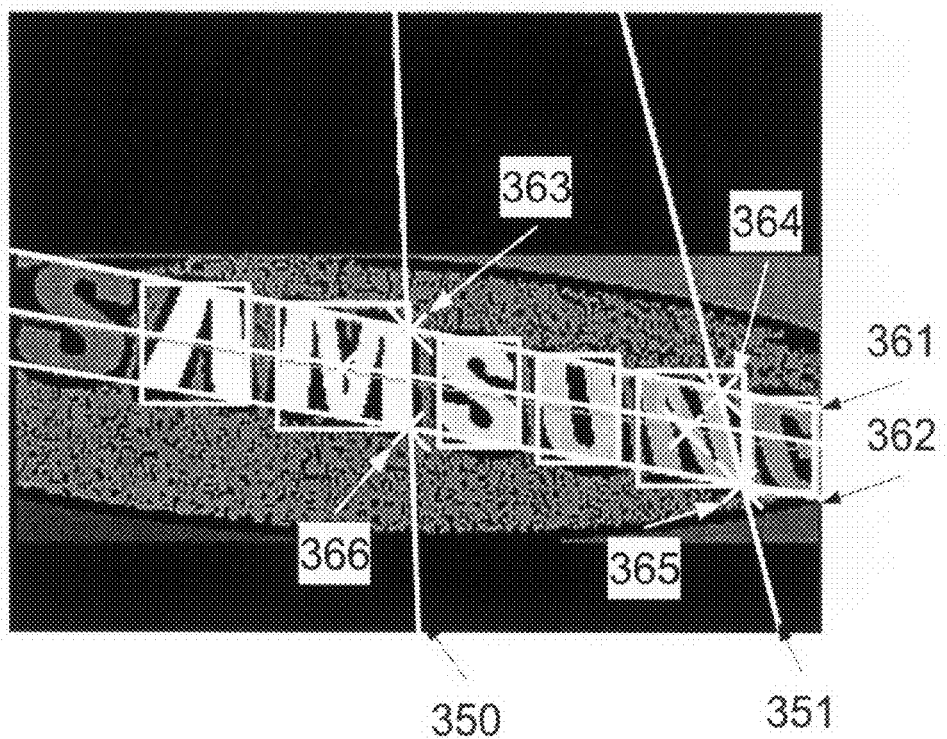
FIG. 9 is the grayscale image of FIG. 5 having longitudinal and latitudinal character bounding lines that bounds characters in the predefined graphic symbol, according to one preferred embodiment of the present invention.

Then, preferably, the equations of lower and upper character bounding lines are computed using pixels from the white components. Such lower and upper character bounding lines are depicted in 361 and 362 in FIG. 9. Computing such bounding lines is similar to calculating the longitudinal character bounding lines. The upper character bounding line is the regression line of the uppermost pixels of the white component in the related character bounding-box and the lower character bounding line is the regression line of the lowermost pixels of the white component in the related character bounding-box.

The equations of the character bounding lines are used for computing the corner points of the white components in the related character bounding-boxes, preferably in a sub-pixel precision. The sub-pixel accuracy of corners is important in order to enhance the quality of augmentation and improve overall experience. The intersections of the upper character bounding line and the longitudinal character bounding lines provide the top right corner of each related graphical character, as shown at 363 and 364 of FIG. 9. The intersections of the lower character bounding line and the longitudinal character bounding lines provides the low right corner of each related graphical character, as shown at 365 and 366 of FIG. 9.

The corner points of the white components, preferably "M" and "N", are used for computing the aforementioned homography matrix together with respective predefined points in the virtual object.

It should be noted that although four points are enough for the computation of the homography matrix, the use of more points may improve accuracy of computation. Preferably, the number of calculated points is increased up to eight, where the four additional points are found by calculating left character bounding lines for M and N, substantially as calculating the aforementioned right character bounding lines, and computing the intersection thereof with the upper and lower character bounding lines. In such a manner, eight corner points may be used for the computation of the homography matrix and for performing the aforementioned tracking, as described below.

Figure 10:
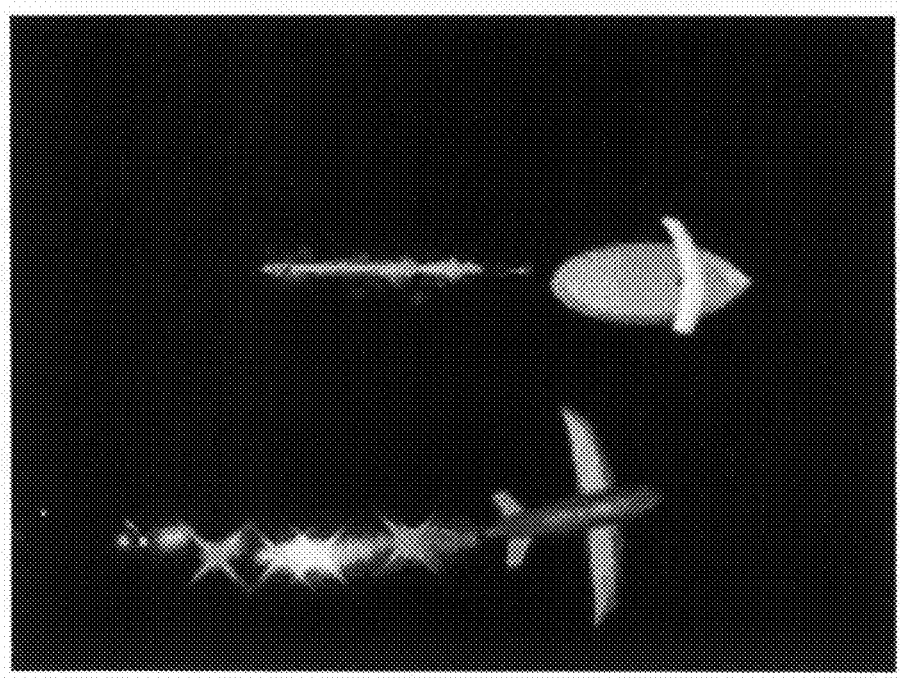
FIG. 10 is a virtual object that comprises two graphical images, according to one preferred embodiment of the present invention.
Figure 11:
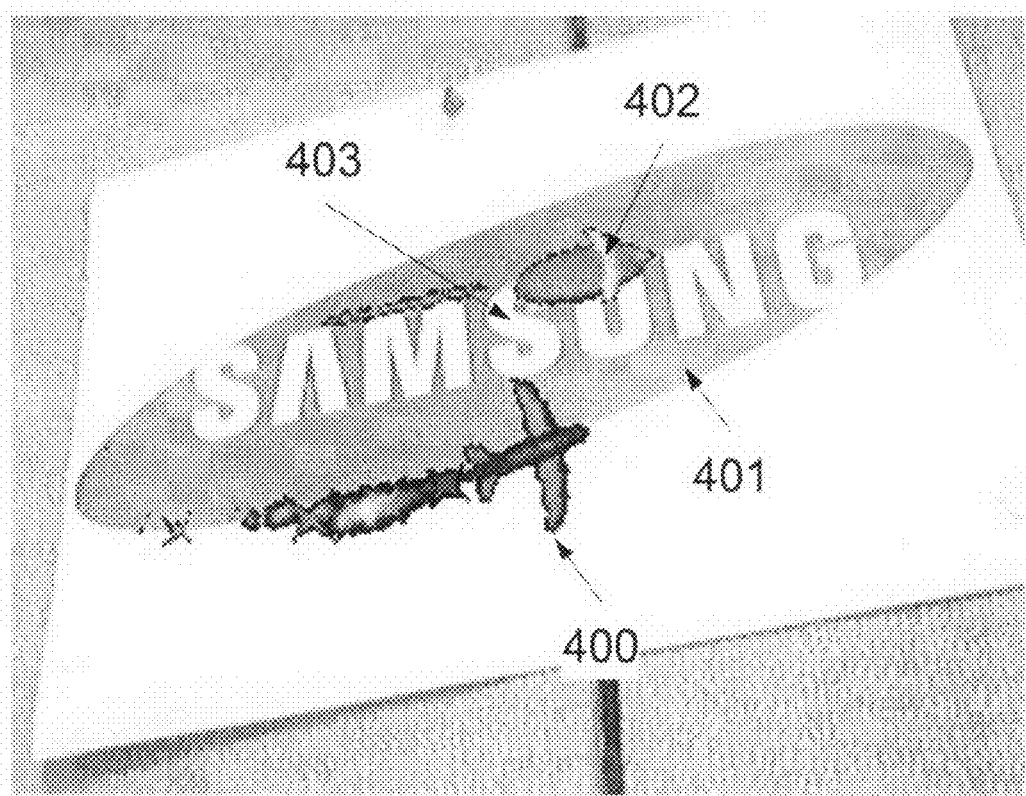
FIG. 11 is an augmented-reality image of the virtual object of FIG. 10 and a digital image that comprises a predefined graphic symbol, according to one preferred embodiment of the present invention.

During the following step, as shown at 302 of FIG. 7, the virtual object is augmented with the received digital image 1, using the homography matrix that has been calculated, as described above, during step 301. In such a manner, a virtual object, for example as shown depicted in FIG. 10, may be augmented with a digital image that comprises a predefined graphic symbol, for example, as shown depicted in FIG. 11 that depicts an augmented-reality image of the virtual object that is depicted in FIG. 10 and a digital image of the predefined graphic symbol Samsung®. Preferably, as depicted in FIGS. 10 and 11, the virtual object comprises a number of graphical elements, such as a plane and boat. Preferably, the virtual object and the digital image are taken from video sequences. In use, the video sequences are augmented, frame by frame, in order to create an augmented video sequence. Preferably, the augmented graphical elements may move around or in the proximity of the predefined graphic symbol that is depicted in the scene, as described above. For example, in FIG. 11, a plane 400 orbits around a blue ellipse 401 of the predefined graphic symbol Samsung® and a boat 402 orbits around a graphical characters 403 thereof.

Figure 12:
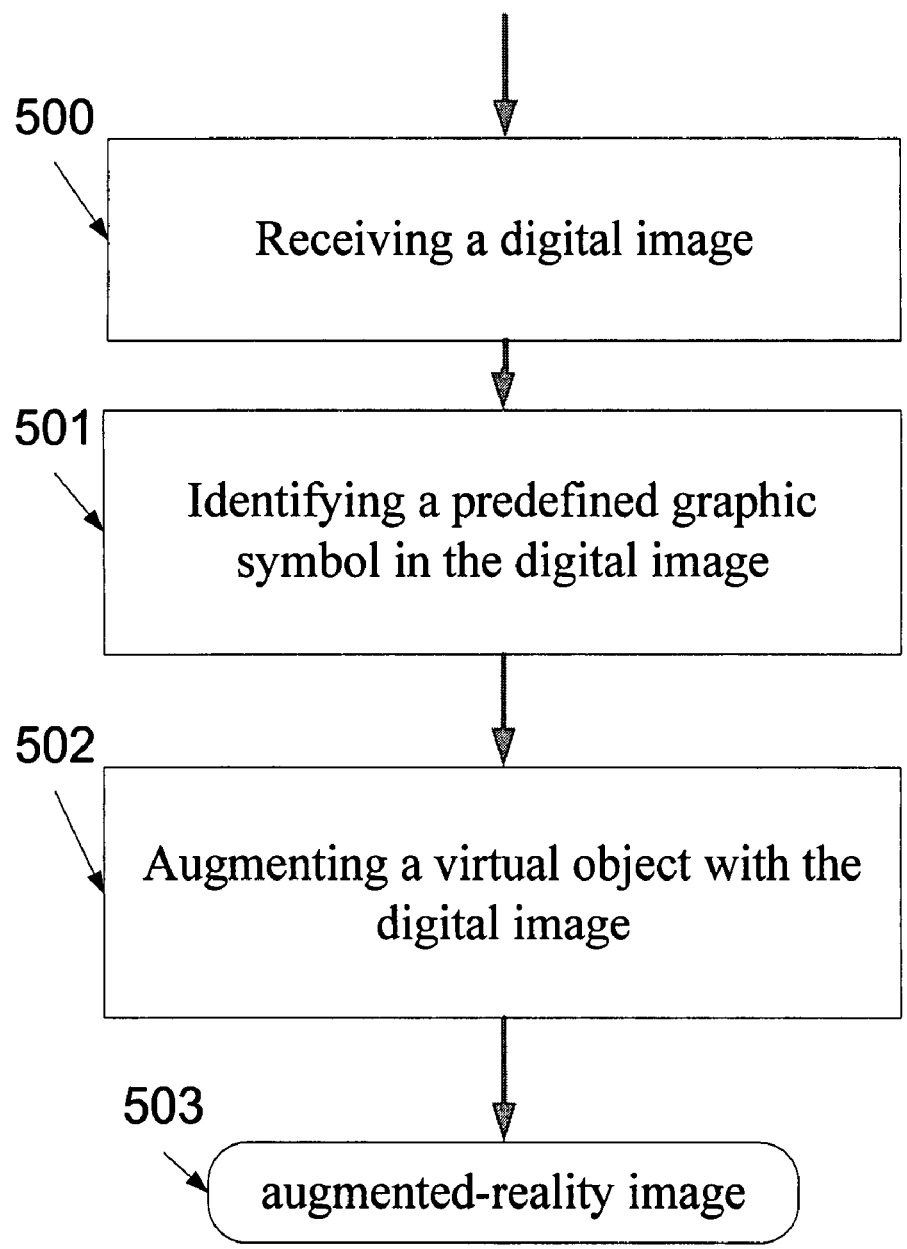
FIG. 12, is a flowchart that illustrates a method for augmenting a virtual object with a digital image having a predefined graphic symbol, according to one preferred embodiment of the present invention.

Reference is now made to FIG. 12, which is a flowchart that illustrates a method for augmenting a virtual object with a digital image having a predefined graphic symbol, according to one preferred embodiment of the present invention. The method comprises a number of steps. During the first step, as shown at 500, the digital image is received. As described above, the digital image comprises predefined graphic symbols having a set of known characteristics. During the following step, as shown at 500, the predefined graphic symbol in identified. As described above, such identification may be performed according to the method that is depicted in FIG. 2. Then, as shown at 502, the digital image is augmented with the virtual object, to create an augmented-reality image with the predefined graphic symbol therein. The augmented-reality image 503 is designed for presentation to a user, preferably using a screen display.

As described above, the digital image may be part of a video sequence. Therefore, consecutive digital images may depict the same scene with slight changes. As further described above, in order to augment a virtual object with the specific digital image, a predefined graphic symbol is identified in the digital image and a number of points therein are tagged and used as reference during the creating of the homography matrix. As the relative location of the predefined graphic symbol and the reference points in the digital images of the video sequence may not be stationary, the location of the reference points have to be calculated for each digital image in order to provide accurate basis for the augmentation. Thus, in order to augment more than one virtual object with more than one digital image, the predefined graphic symbol has to be repeatedly identified in each digital image, the reference points have to be repeatedly located, and the reference points have to be repeatedly tagged. However, as video sequences usually depicts the same scene with slight changes, the computational complexity of the aforementioned identification of the predefined graphic symbol and the image augmentation may be reduced if, in use, the reference points are tracked instead of being repeatedly identified. Preferably, the aforementioned corner points are tracked instead of being re-identified for each digital image in the video sequence. Preferably, an optical flow algorithm is used for tracking the corner points. The used optic-flow method is based on the optic-flow algorithm that has been published, inter alia, by B. D. Lucas et al., see Lucas B. D. and Kanade, *An iterative image registration technique with an application to stereo vision, Proceedings of the 7th International Joint Conference on Artificial Intelligence (IJCAI '81)*, April, 1981, pp. 674-679, which is herein incorporated in its entirety by reference into the specification.

The corner points are used for homography matrix computation and augmentation, as described above. It should be noted that the tracking increases the stability of augmentation as it reduces abrupt and unwanted variations in the corners.

In one embodiment of the present invention, the virtual object and the digital image are three-dimensional. Preferably, the virtual object is a 3D model of a certain object that is rendered on the digital image with respect to the plane of the graphical symbol in relation to the image plane. It should be noted that in order to enable such an augmentation of the 3D object with the digital image, the accurate position and orientation of the camera with respect to the predefined graphic symbol has to be found. Such a pose may be calculated according to the homography matrix, using known methods.

For example, the pose is defined by a 4×3 matrix that transforms a three-dimensional point represented in homogeneous coordinates in the camera coordinates system to a point in the graphic symbol coordinates system. Under reasonable assumptions, the homography is the first, the second and the fourth columns of the camera pose matrix. As the leftmost three columns of the matrix are an orthogonal rotation 3×3 matrix, the third column may be recovered using the related orthogonality constraint. It should be noted that other methods that allow the recovery of the pose matrix without using the orthogonality constraint may be used. Such methods may use the correspondences between scene points to image points for calculating the pose and may not use the homography matrix calculated in previous steps at all.

Figure 13:
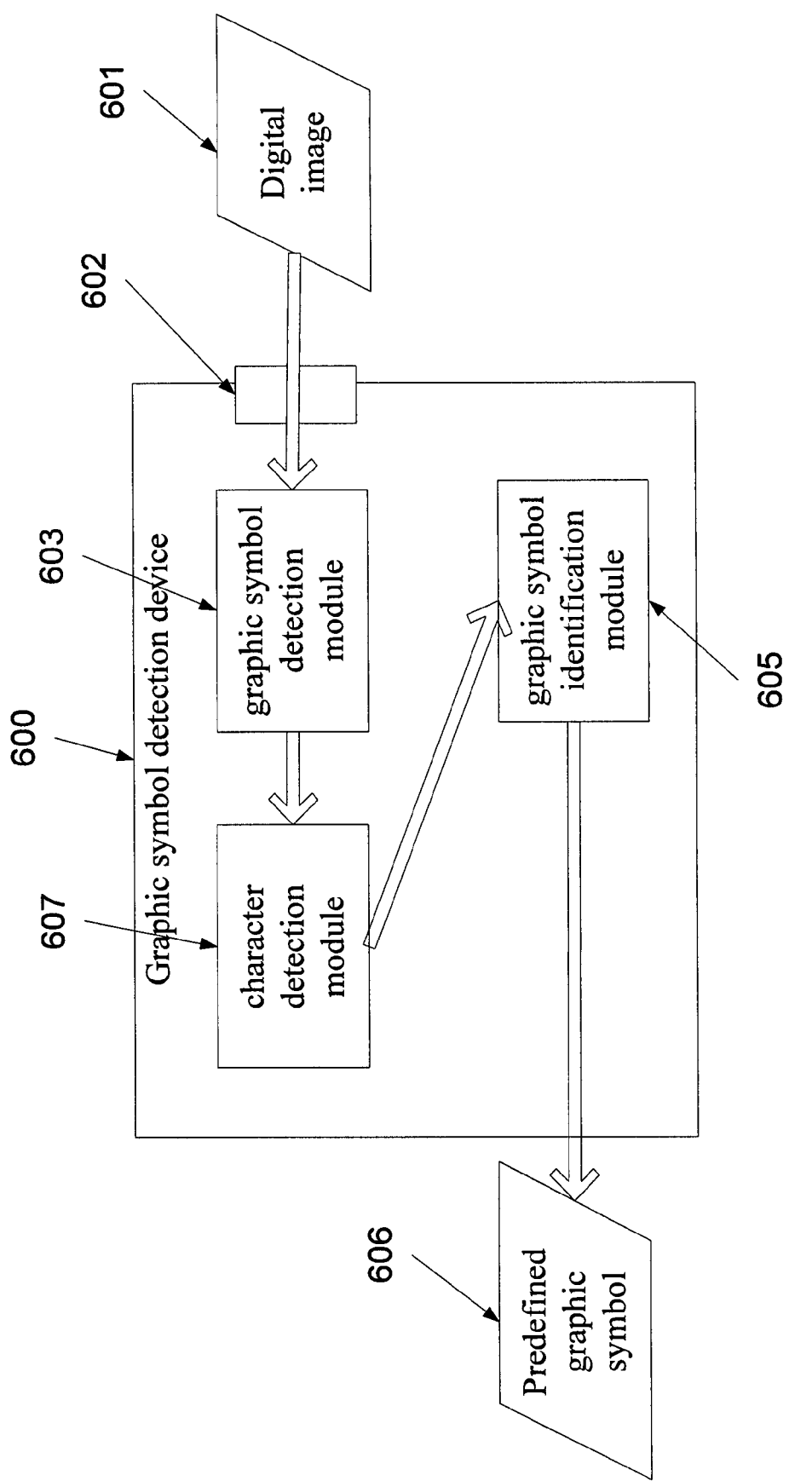
FIG. 13 is a schematic illustration of a graphic symbol detection device for identifying a predefined graphic symbol in a digital image input, according to a preferred embodiment of present invention.

Reference is now made to FIG. 13, which is a schematic illustration of a graphic symbol detection device 600, according to a preferred embodiment of the present invention. The graphic symbol detection device 600 is adapted to receive a digital image 601 from an image sensor via a designated image input module 602. The received digital image comprises a predefined graphic symbol. Preferably, the image sensor is an image sensor that is based on a complementary metal oxide semiconductor (CMOS) or a charged coupled device (CCD) technology. Preferably, the graphic symbol detection device is a mobile phone or a PDA having a built-in camera that is used as an image input module 602.

The digital image is transferred to a graphic symbol detection module 603. The graphic symbol detection module 603 is used to identify a symbol segment from the digital image. The symbol segment delimits the predefined graphic symbol that is depicted in the digital image. The delimitation enhances a faster analysis of the graphic symbol area and preferably reduces the computational complexity of detecting and tracking reference points for augmenting a virtual object, as described above. The candidate symbol segment is transferred to a character detection module 607. The character detection module 607 is used for identifying graphical characters in the symbol segment. The graphical characters and the symbol segment are transferred to a graphic symbol identification module 605. The graphic symbol identification module 605 is used for identifying specific characters in the symbol segment. Based upon the identification, the identified predefined graphic symbol 606 or an indication for the identification is outputted. Preferably, a homography matrix is identified, as described above, and a virtual object is augmented with the digital image with the predefined graphic symbol. In another embodiment of the present invention, the homography matrix is based on four or more reference points in the digital image and respective points in the virtual object.

It is expected that during the life of this patent many relevant devices and systems will be developed and the scope of the terms herein, particularly of the terms image, label, graphic symbol, graphical character, and sensor are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computerized method for identifying and animating a predefined graphic symbol having a plurality of graphical characters using a processor, said method comprising:
   a) providing a predefined graphic symbol having a plurality of graphical characters;
   b) receiving a digital image having a plurality of pixels depicting a real world scene with containing said predefined graphic symbol;
   c) identifying, using the processor, a plurality of first groups of contiguous pixels in the proximity of one another, members of each one said first group having a first common pixel defining property;
   d) identifying at least one of said plurality of first groups as one of the plurality of graphical characters of said predefined graphic symbol, thereby detecting, using the processor, the predefined graphic symbol in said digital image;
   e) calculating, using the processor, a virtual plane according to a plurality of reference points of said plurality of first groups; and
   f) augmenting at least one virtual object, on said virtual plane, in a presentation of said digital image according to the location of said predefined graphic symbol in said real world scene.

2. The method of claim 1, further comprising identifying a second group of contiguous pixels, said second group having a second common pixel defining property, wherein said plurality of first groups is in the proximity of said second group.

3. The method of claim 2, wherein said identifying said second group of contiguous pixels comprises substantially enclosing said plurality of first groups in a second bounding-box, said second bounding-box being used during step d).

4. The method of claim 3, further comprising generating a binary map image based on said second bounding-box, said identifying of step c) being performed according to said binary map.

5. The method of claim 4, wherein said generating comprises a step of applying a color property threshold on the color property of the plurality of pixels.

6. The method of claim 5, wherein said color property threshold is a member of the following group: a constant threshold, a dynamic threshold, and a Niblack threshold.

7. The method of claim 1, further comprising identifying an order of said plurality of first groups in relation to the position of each one of them in said digital image, said identifying of step d) being performed according to the place of said at least one of said plurality of first groups in said order.

8. The method of claim 7, further comprising identifying a line that approximately intersects the geometric center of each said first group, said order being determined according to a relative position of each said first group along said line.

9. The method of claim 8, wherein said line is a regression line.

10. The method of claim 7, further comprising detecting and removing outlier groups from said plurality of first groups.

11. The method of claim 1, wherein said identifying of step c) comprises a step of substantially enclosing each said first group in a respective first bounding-box, said first bounding-boxes being used during step d).

12. The method of claim 1, further comprising:
identifying a homography matrix according to at least one of said identified plurality of first groups; and
using said homography matrix for augmenting a virtual object with said digital image.

13. The method of claim 12, wherein said homography matrix is calculated according to at least four reference points of said identified plurality of first groups.

14. The method of claim 13, each three of said at least four references are non-collinear.

15. The method of claim 1, wherein said identifying of step c) comprises a step of finding connected components, each said connected component being tagged as one of said plurality of first groups.

16. The method of claim 1, wherein said identifying of step c) comprising a step of removing members of said plurality of first groups that do not comply with a set of predefined geometric characteristics.

17. The method of claim 16, wherein said set of predefined geometric characteristics comprises a member of the following group: a predefined aspect ratio between the width and the height, having an area in a predefined range, having an area in a predefined range in relation to an area that encloses said first group, having an area in a predefined range in relation at least a portion of said plurality of first groups.

18. The method of claim 1, wherein said providing comprises using an imaging device for capturing said digital image and rendering said digital image with said digital image and said at least one augmented virtual object on a display.

19. The method of claim 18, wherein said rendering is performed according to the position of the imaging device.

* * * * *